(12) United States Patent
Takayama et al.

(10) Patent No.: US 11,345,433 B2
(45) Date of Patent: May 31, 2022

(54) BRAKE CONTROL DEVICE, BRAKING DEVICE INCLUDING BRAKE CONTROL DEVICE, AND BRAKE SYSTEM

(71) Applicant: Shimano Inc., Osaka (JP)

(72) Inventors: Hitoshi Takayama, Osaka (JP); Masahiko Fukuda, Osaka (JP); Toshihiko Takahashi, Osaka (JP); Daisuke Nago, Osaka (JP); Masahiro Nakakura, Osaka (JP); Takafumi Nishino, Osaka (JP); Takehiko Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 186 days.

(21) Appl. No.: 16/255,376

(22) Filed: Jan. 23, 2019

(65) Prior Publication Data
US 2019/0233048 A1 Aug. 1, 2019

(30) Foreign Application Priority Data

Jan. 26, 2018 (JP) .............................. JP2018-012027

(51) Int. Cl.
*B62L 3/02* (2006.01)
*B62J 45/20* (2020.01)
(Continued)

(52) U.S. Cl.
CPC ................. *B62L 3/02* (2013.01); *B62J 43/13* (2020.02); *B62J 43/30* (2020.02); *B62J 45/20* (2020.02);
(Continued)

(58) Field of Classification Search
CPC ..... B62L 1/00; B62L 3/02; B62J 99/00; B62J 50/20; B62J 45/20; B62J 6/045;
(Continued)

(56) References Cited

U.S. PATENT DOCUMENTS 6,320,336 B1 11/2001 Eguchi
2004/0084238 A1 5/2004 Yokotani et al.
(Continued)

FOREIGN PATENT DOCUMENTS

DE 10 2013 217 885 A1 3/2015
DE 10 2014 005 527 A1 10/2015
(Continued)

OTHER PUBLICATIONS

How stuffs works—ABS system "https://web.archive.org/web/20140118223048/http://auto.howstuffworks.com/auto-parts/brakes/brake-types/anti-lock-brake1.htm" (Year: 2014).*

*Primary Examiner* — Ig T An
(74) *Attorney, Agent, or Firm* — Global IP Counselors, LLP

(57) ABSTRACT

A brake control device includes an electronic controller that is configured to control a braking unit that is configured to brake at least one of a plurality of rotating bodies of a human-powered vehicle. The electronic controller is configured to control the braking unit upon determining an ABS control is performed to decrease a braking force of a first rotating body included in the plurality of rotating bodies so that a braking force of a second rotating body, which is different from the first rotating body and included in the plurality of rotating bodies, is increased by a force that is different from hydraulic pressure.

26 Claims, 6 Drawing Sheets

(51) Int. Cl.
  *B62J 50/22* (2020.01)
  *B62J 43/13* (2020.01)
  *B62J 43/30* (2020.01)
  *B62L 1/00* (2006.01)
  *B62M 6/55* (2010.01)

(52) U.S. Cl.
  CPC ............. *B62J 50/22* (2020.02); *B62L 1/00* (2013.01); *B62M 6/55* (2013.01)

(58) Field of Classification Search
  CPC ............ B62M 6/55; B60W 30/18109; B60W 2510/18; B60W 2710/18; B60Y 2300/18108; B60Y 2400/81; B60G 2800/22; B60L 3/0076; B60L 3/108; B60T 2270/60; B60T 2270/602
  See application file for complete search history.

(56) References Cited

U.S. PATENT DOCUMENTS

| | | | | |
|---|---|---|---|---|
| 2007/0018499 | A1* | 1/2007 | Kokubo | B60L 7/14 |
| | | | | 303/151 |
| 2011/0253489 | A1* | 10/2011 | Ward | B60T 8/4208 |
| | | | | 188/156 |
| 2012/0012412 | A1* | 1/2012 | Moeller | B62M 6/65 |
| | | | | 180/206.2 |
| 2012/0305345 | A1* | 12/2012 | Ward | B60T 8/4009 |
| | | | | 188/72.4 |
| 2016/0318575 | A1* | 11/2016 | Shimoda | B62L 3/023 |
| 2017/0182986 | A1* | 6/2017 | Dackermann | B62L 3/023 |
| 2020/0269949 | A1 | 8/2020 | Ikeda | |

FOREIGN PATENT DOCUMENTS

| | | |
|---|---|---|
| EP | 2 554 444 A2 | 2/2013 |
| EP | 2 977 281 A1 | 1/2016 |
| JP | 2000-118477 A | 4/2000 |
| JP | 2004-149001 A | 5/2004 |
| JP | 2005-153842 A | 6/2005 |
| JP | 5715523 B2 | 3/2015 |
| JP | 2017-109699 A | 6/2017 |
| JP | 2017-516713 A | 6/2017 |
| JP | 6262202 B2 | 12/2017 |

\* cited by examiner

BRAKE CONTROL DEVICE, BRAKING DEVICE INCLUDING BRAKE CONTROL DEVICE, AND BRAKE SYSTEM

CROSS-REFERENCE TO RELATED APPLICATIONS

This application claims priority to Japanese Patent Application No. 2018-012027, filed on Jan. 26, 2018. The entire disclosure of Japanese Patent Application No. 2018-012027 is hereby incorporated herein by reference.

BACKGROUND

Technical Field

The present invention generally relates to a relates to a brake control device, a braking device including a brake control device, and a brake system.

Background Information

In a case where a known brake control device of a human-powered vehicle provided with an Antilock Brake System (ABS) function performs ABS control is performed, the braking pressures of a front wheel and a rear wheel are changed. For example, Japanese Laid-Open Patent Publication No. 2017-516713 discloses a brake control device that distributes the hydraulic braking pressure.

SUMMARY

It is preferred that decreases in the braking force of the human-powered vehicle be limited even in a case where the ABS control is performed.

One object of the present disclosure is to provide a brake control device, a braking device including a brake control device, and a brake system that limit decreases in the braking force.

A brake control device in accordance with a first aspect of the present disclosure comprises an electronic controller configured to control a braking unit that is configured to brake at least one of a plurality of rotating bodies of a human-powered vehicle. The electronic controller is configured to control the braking unit upon determining an ABS control is performed to decrease a braking force of a first rotating body included in the plurality of rotating bodies so that a braking force of a second rotating body, which is different from the first rotating body and included in the plurality of rotating bodies, is increased by a force that is different from hydraulic pressure.

In accordance with the first aspect, in the brake control device, the braking unit is controlled so that the braking force of the second rotating body, which is different from the first rotating body, is increased by a force that is different from hydraulic pressure in a case where the braking force of the first rotating body of the human-powered vehicle is decreased by the ABS control. This limits decreases in the braking force of the human-powered vehicle.

In accordance with a second aspect of the present disclosure, in the brake control device according to the first aspect, the electronic controller is configured to increase the braking force of the second rotating body in accordance with a decrease amount of the braking force of the first rotating body.

In accordance with the second aspect, the brake control device is configured so that the braking force of the second rotating body is increased in accordance with the decrease amount of the braking force of the first rotating body. This limits decreases in the braking force.

In accordance with a third aspect of the present disclosure, in the brake control device according to the second aspect, the electronic controller is configured to increase the braking force of the second rotating body so that an absolute value of a difference between an increase amount of the braking force of the second rotating body and a decrease amount of the braking force of the first rotating body becomes smaller than or equal to a predetermined difference.

In accordance with the third aspect, in the brake control device, the braking force of the second rotating body is increased so that the absolute value of the difference with the decrease amount of the braking force of the first rotating body becomes smaller than or equal to a predetermined difference. This limits decreases in the braking force.

In accordance with a fourth aspect of the present disclosure, the brake control device according to the third aspect is configured so that the predetermined difference is zero.

In accordance with the fourth aspect, the brake control device is configured so that the predetermined difference is zero. This limits decreases in the braking force.

In accordance with a fifth aspect of the present disclosure, in the brake control device according to any one of the first to fourth aspects, the electronic controller is configured to increase the braking force of the second rotating body in upon determining a decrease amount of the braking force of the first rotating body is occurring that is larger than or equal to a predetermined decrease amount.

In accordance with the fifth aspect, the brake control device increases the braking force of the second rotating body in a case where a decrease amount of the braking force of the first rotating body is larger than or equal to a predetermined decrease amount. This limits decreases in the braking force.

In accordance with a sixth aspect of the present disclosure, in the brake control device according to the any one of the first to fifth aspects, the electronic controller is configured to increase the braking force of the second rotating body so that the braking force of the second rotating body does not exceed an upper limit braking force.

In accordance with the sixth aspect, in the brake control device, the braking force of the second rotating body is increased so that the braking force of the second rotating body does not exceed the upper limit braking force. This limits excessive generation of the braking force.

In accordance with a seventh aspect of the present disclosure, in the brake control device according to any one of the first to sixth aspects, the electronic controller is configured to adjust an increase rate of the braking force of the second rotating body in accordance with a decrease rate of the braking force of the first rotating body.

In accordance with the seventh aspect, the brake control device is configured so that the increase rate of the second rotating body is adjusted in accordance with the decrease rate of the braking force of the first rotating body. This shortens the time during which the braking force decreases.

In accordance with an eighth aspect of the present disclosure, in the brake control device according to any one of the first to seventh aspects, the electronic controller is configured to decrease the braking force of the second rotating body upon determining the braking force of the first rotating body increases after the braking force of the first rotating body has decreased.

In accordance with the eighth aspect, the brake control device is configured so that the braking force of the second rotating body is decreased in a case where the braking force of the first rotating body is increased after the braking force of the first rotating body is decreased. This limits excessive generation of the braking force.

In accordance with a ninth aspect of the present disclosure, in the brake control device according to any one of the first to eighth aspects, the electronic controller is configured to determine that the ABS control will decrease the braking force of the first rotating body upon determining a predetermined condition is satisfied.

In accordance with the ninth aspect, the brake control device is configured to determine that the ABS control will decrease the braking force of the first rotating body in a case where a predetermined condition is satisfied. This controls the braking force in a further preferred manner.

In accordance with a tenth aspect of the present disclosure, in the brake control device according to the ninth aspect, the electronic controller is configured to determine whether or not the predetermined condition is satisfied based on traveling information related with traveling of the human-powered vehicle.

In accordance with the tenth aspect, the brake control device is configured to determine whether a predetermined condition is satisfied based on the traveling information related traveling. This controls the braking force in a further preferred manner.

A braking device in accordance with an eleventh aspect of the present disclosure comprises the brake control device according to any one of the first to tenth aspects; and the braking unit.

In accordance with the eleventh aspect, the braking device includes a braking unit. This controls the braking force of the human-powered vehicle in a further preferred manner.

In accordance with a twelfth aspect of the present disclosure, the braking device according to the eleventh aspect is configured so that the braking unit includes a first braking unit that brakes the first rotating body and a second braking unit that brakes the second rotating body.

In accordance with the twelfth aspect, the braking device includes the first braking unit that brakes the first rotating body and the second braking unit that brakes the second rotating body. Thus, braking that is in accordance with the rotating body is performed.

In accordance with a thirteenth aspect of the present disclosure, the braking device according to the twelfth aspect is configured so that the first braking unit includes a power source and the second braking unit includes a power source that is different from the power source of the first braking unit.

In accordance with the thirteenth aspect, the braking device is configured to brake the rotating bodies with different power sources. Thus, the rotating bodies are braked in a suitable manner.

In accordance with a fourteenth aspect of the present disclosure, the braking device according to the twelfth or thirteenth aspect is configured so that the first braking unit includes at least one of a hydraulic braking unit, an electric braking unit, a regenerative braking unit, and a mechanical braking unit.

In accordance with the fourteenth aspect, the braking device is configured so that the first rotating body is braked by at least one of the hydraulic braking unit, the electric braking unit, the regenerative braking unit, and the mechanical braking unit. Therefore, braking suitable for the rotating body is performed.

In accordance with a fifteenth aspect of the present disclosure, the braking device according to the twelfth to fourteenth aspects is configured so that the second braking unit includes at least one of an electric braking unit, a regenerative braking unit, and a mechanical braking unit, and does not include a hydraulic braking unit.

In accordance with the fifteenth aspect, the braking device is configured so that the second rotating body is braked by at least one of the electric braking unit, the regenerative braking unit, and the mechanical braking unit. Therefore, braking suitable for the rotating body is performed.

In accordance with a sixteenth aspect of the present disclosure, the braking device according to the fourteenth or fifteenth aspect is configured so that the regenerative braking unit includes an assist motor configured to assist a driving force of the human-powered vehicle.

In accordance with the sixteenth aspect, the braking device is configured so that the regenerative braking unit includes the assist motor. Therefore, the battery can be charged.

In accordance with a seventeenth aspect of the present disclosure, the braking device according to the eleventh to sixteenth aspects further comprises an operating device configured to be manually operated to brake the rotating body with the braking unit.

In accordance with the seventeenth aspect, the braking device includes a manually operated operating device. Therefore, the braking unit can be suitably controlled by the user.

A brake control device in accordance with an eighteenth aspect of the present disclosure comprises an electronic controller configured to control a braking unit that is configured to brake at least one of a plurality of rotating bodies of a human-powered vehicle. The electronic controller being further configured to control the braking unit to perform an ABS control for braking a first rotating body included in the plurality of rotating bodies. The electronic controller is configured to output, from a notification device, brake-related information for braking a second rotating body, which is different from the first rotating body and included in the plurality of rotating bodies upon determining the ABS control is being performed to decrease a braking force of the first rotating body.

In accordance with the eighteenth aspect, the brake control device is configured so that, in a case where the braking force of the first rotating body is decreased by the ABS control, the electronic controller outputs, from the notification device, brake-related information for braking the second rotating body, which is different from the first rotating body. This allows the user to recognize the brake-related information.

In accordance with a nineteenth aspect of the present disclosure, the brake control device according to the eighteenth aspect is configured so that the brake-related information includes information prompting an operation to be performed to brake the second rotating body.

In accordance with the nineteenth aspect, the brake control device is configured to output the brake-related information including information prompting an operation to be performed to brake the second rotating body. Therefore, the user can recognize that a braking operation needs to be performed on the second rotating body.

A braking device according to a twentieth aspect of the present disclosure comprises the brake control device according to the eighteenth or nineteenth aspect, and the notification device.

In accordance with the twentieth aspect, the braking device includes the notification device. Therefore, the user can easily recognize the brake-related information.

In accordance with a twenty-first aspect of the present disclosure, the braking device according to the twentieth aspect is configured so that the notification device includes a display configured to display the brake-related information.

In accordance with a twenty-first aspect, the braking device is configured so that the notification device includes a display that displays the brake-related information. Therefore, the user can obtain the brake-related information by looking at it.

In accordance with a twenty-second aspect of the present disclosure, in the braking device according to the twentieth or twenty-first aspect, the notification device is configured to output the brake-related information by producing at least one of light, vibration, and sound.

In accordance with the twenty-second aspect, the braking device is configured so that the notification device is configured to output the brake-related information using means including at least one of light, vibration, and sound. This allows the brake-related information to be perceived.

A brake system in accordance with a twenty-third aspect of the present disclosure comprises a brake control device including an electronic controller configured to control a braking unit that is configured to brake at least one of a plurality of rotating bodies of a human-powered vehicle, and an assist device including an assist motor configured to assist driving of the human-powered vehicle. The electronic controller is configured to control the braking unit upon determining an ABS control is being performed to decrease a braking force of a first rotating body included in the plurality of rotating bodies, such that a braking force of a second rotating body, which is different from the first rotating body and included in the plurality of rotating bodies is increased.

In accordance with the twenty-third aspect, the brake system of the human-powered vehicle is configured so that, in the case where the braking force of the first rotating body is decreased by the ABS control, the braking unit is controlled so that the braking force of the second rotating body increases. This limits decreases in the braking force.

The brake control device, the braking device including the brake control device, and the brake system of in accordance with the present disclosure limit decreases in the braking force.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

First Embodiment

Figure 1:
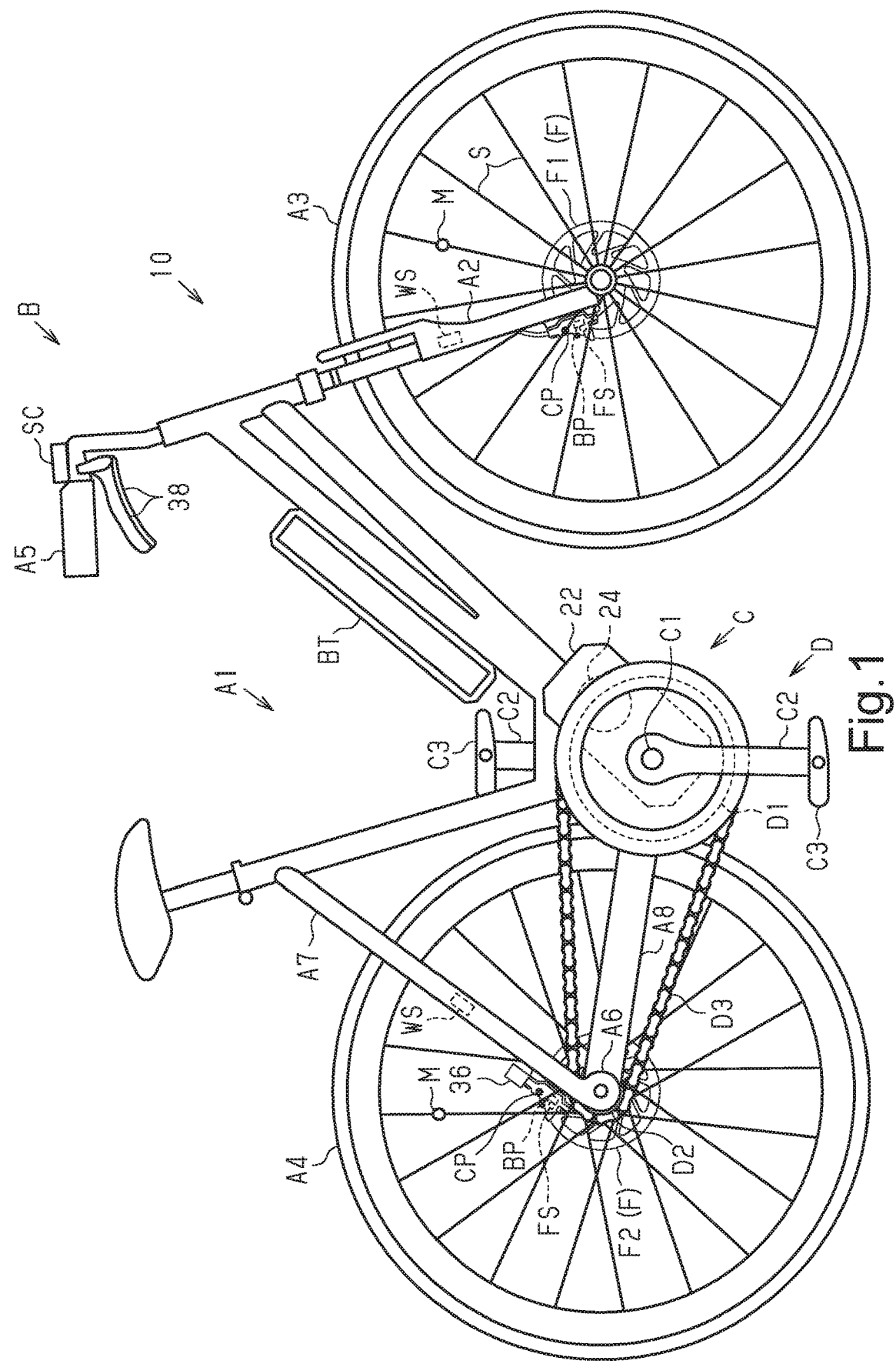
FIG. 1 is a side elevational view of a human-powered vehicle equipped with a brake system in accordance with a first embodiment.

A human-powered vehicle B including a brake system 10 will be now described with reference to FIG. 1. The human-powered vehicle refers to a vehicle that at least partially uses human force as a prime mover for traveling and includes vehicles that assist human force with electric power. The human-powered vehicle does not include vehicles that only use force other than human force as a prime mover. In particular, the human-powered vehicle does not include vehicles that use only an internal combustion engine as the prime mover. Generally, the human-powered vehicle is assumed to be a compact light vehicle that does not require a license for driving on a public road. The illustrated human-powered vehicle B is a bicycle (e-bike) including an assist device 22 that assists the propulsion of the human-powered vehicle B using electric energy. Specifically, the illustrated human-powered vehicle B is a city cycle. The configuration of the human-powered vehicle B can be changed to any configuration. The human-powered vehicle B can be configured without the assist device 22. In other words, the human-powered vehicle B can be a normal bicycle driven only by human driving force. The type of human-powered vehicle B can be a road bike, a mountain bike, or a cross bike. The human-powered vehicle B further includes a frame A1, a front fork A2, a front wheel A3, a rear wheel A4, a handlebar A5, and a drive train D.

The drive train D is configured as a chain drive type. The drive train D includes a crank C, a front sprocket D1, a rear sprocket D2, and a chain D3. The crank C includes a crankshaft C1, a pair of crank arms C2, and a pair of pedals C3. The two pedals C3 are rotatably attached to the distal ends of the crank arms C2. The drive train D can be of any type and can be of a belt drive type or a shaft drive type.

The front sprocket D1 is provided on the crank C so as to rotate integrally with the crankshaft C1. The rear sprocket D2 is provided on a hub A6 of the rear wheel A4. The chain D3 is wound around the front sprocket D1 and the rear sprocket D2. The driving force applied to the pedals C3 by the user riding the human-powered vehicle B is transmitted to the rear wheel A4 through the front sprocket D1, the chain D3, and the rear sprocket D2.

Figure 2:
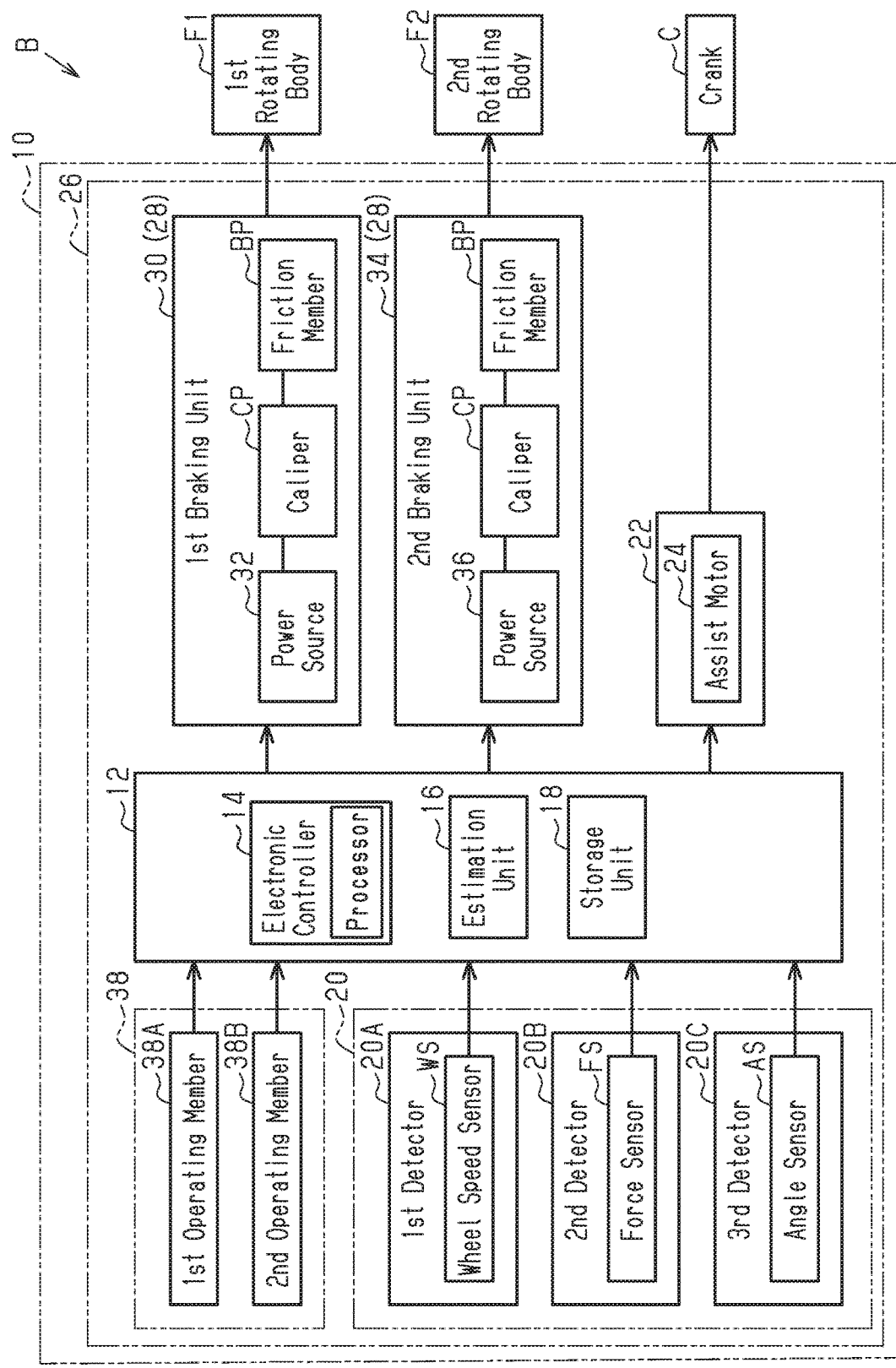
FIG. 2 is a block diagram diagrammatically showing the brake system of FIG. 1.

The brake system 10 will be now described with reference to FIG. 2. The brake system 10 includes a brake control device 12 and the assist device 22. The brake control device 12 is driven by electric power supplied from, for example, a battery BT. The brake control device 12 includes an electronic controller 14, an estimation unit 16, and a storage unit 18. The electronic controller 14 is a central processing unit (CPU) or a micro-process sing unit (MPU). The electronic controller 12 is preferably a microcomputer that includes one or more processors. The electronic controller 12 is formed of one or more semiconductor chips that are mounted on a printed circuit board. The term "electronic controller" as used herein refers to hardware that executes a software program. The electronic controller 14 controls a braking unit 28 that brakes at least one of a plurality of rotating bodies F of the human-powered vehicle B. The rotating bodies F include a first rotating body F1 provided on the front wheel A3 and a second rotating body F2 provided on the rear wheel A4.

The estimation unit 16 estimates information related with the human-powered vehicle B based on information of the human-powered vehicle B acquired by a detector 20. In one example, the information related with the human-powered vehicle B is the traveling speed of the human-powered vehicle B. In another example, the information related with the human-powered vehicle B is the braking force acting on the rotating body F of the human-powered vehicle B. In a further example, the information related to the human-powered vehicle B is the operation amount of an operating device 38 (i.e., a user input device). The information estimated by the estimation unit 16 is stored in the storage unit 18.

The storage unit 18 stores information related with predetermined conditions, information related with ABS operating conditions, and information related with programs executed by the electronic controller 14. The storage unit 18 is any computer storage device or any computer readable medium with the sole exception of a transitory, propagating signal. The storage unit 18 includes, for example, a nonvolatile memory and a volatile memory. The nonvolatile memory includes, for example, a read only memory (ROM), a hard disk, and a flash memory. The volatile memory includes, for example, a random access memory (RAM). The electronic controller 14 refers to the information in the storage unit 18 to determine whether to perform the ABS control.

The detector 20 detects the information of the human-powered vehicle B. The detector 20 includes a first detector 20A, a second detector 20B, and a third detector 20C. The first detector 20A detects the traveling speed of the human-powered vehicle B. In one example, the first detector 20A includes a plurality of wheel speed sensors WS. For example, the wheel speed sensors WS include a wheel speed sensor WS that is provided on the front fork A2 to detect a magnet M provided on a spoke S of the front wheel A3 and a wheel speed sensor WS that is provided on the seat stay A7 of the frame A1 to detect a magnet M provided on a spoke S of the rear wheel A4 (see FIG. 1). The rotation speed of the front wheel A3 is detected by the wheel speed sensor WS corresponding to the front wheel A3, and the rotation speed of the rear wheel A4 is detected by the wheel speed sensor WS corresponding to the rear wheel A4. The wheel speed sensors WS detect the traveling speed of the human-powered vehicle B based on at least one of the rotation speed of the front wheel A3 and the rotation speed of the rear wheel A4. The wheel speed sensor WS corresponding to the rear wheel A4 can be provided on the chain stay A8 (see FIG. 1) of the frame A1. The second detector 20B includes a force sensor FS that detects a braking force acting on one of the rotating bodies F of the human-powered vehicle B. For example, the force sensor FS is provided on a friction member BP to detect the pressing force of the friction member BP that is configured to contact a corresponding one of the rotating bodies F (see FIG. 1). The third detector 20C includes an angle sensor AS that detects the operation amount of the operating device 38. The angle sensor AS is provided, for example, on the operating device 38 (see FIG. 7).

The assist device 22 includes an assist motor 24 that assists driving of the human-powered vehicle. The assist motor 24 is actuated in accordance with the driving force applied to the pedal C3. The braking device 26 includes the brake control device 12 and the braking unit 28. The braking unit 28 includes a first braking unit 30 configured to brake the first rotating body F1 and a second braking unit 34 configured to brake the second rotating body F2. The first braking unit 30 includes at least one of a hydraulic braking unit, an electric braking unit, a regenerative braking unit, and a mechanical braking unit. The first braking unit 30 includes a power source 32. The power source 32 includes, for example, an electric motor. The first braking unit 30 further includes the friction member BP and a caliper CP. The friction member BP is provided, for example, on the caliper CP. The power source 32 is driven to drive the caliper CP so that the friction member BP comes into contact with the first rotating body F1. The first rotating body F1 is, for example, a disc brake rotor provided on the front wheel A3 of the human-powered vehicle B.

In the hydraulic braking unit, for example, the caliper CP is fluidly driven by the power source 32 to brake the rotating body F. The hydraulic braking unit includes an actuator (not shown) that is driven by the power source 32 to supply fluid to the caliper CP. An example of a fluid that is a power transmission medium is hydraulic oil. The actuator includes, for example, a hydraulic pump. The actuator is driven by the power source 32 so that when the pressure of the fluid acts on the friction member BP through the caliper CP, the friction member BP contacts and brakes the rotating body F. In the electric braking unit, for example, the caliper CP is electrically driven by the power source 32 to brake the rotating body F. In this example, the power source 32 is provided, for example, on the caliper CP. When the caliper CP is electrically driven by the power source 32, the friction member BP contacts and brakes the rotating body F. In the mechanical braking unit, for example, the caliper CP is mechanically driven by the power source 32 to brake the rotating body F. The mechanical braking unit includes an actuator (not shown) which is driven by the power source 32 to actuate the caliper CP with a cable (Bowden cable). When the actuator is driven by the power source 32 and actuates the caliper CP by pulling the cable, the friction member BP contacts and brakes the rotating body F. In the regenerative braking unit, for example, the power source 32 is configured to be regenerative. The regenerative braking unit includes an assist motor 24 that assists the driving force of the human-powered vehicle B. In this example, the power source 32 includes the assist motor 24. The assist motor 24 is actuated to brake the rotating body F and thereby be regenerated. In the present embodiment, the first braking unit 30 is a hydraulic braking unit.

The second braking unit 34 brakes the second rotating body F2. The second braking unit 34 includes at least one of an electric braking unit, a regenerative braking unit, and a mechanical braking unit, and does not include a hydraulic braking unit. The second braking unit 34 includes a power source 36. The power source 36 includes, for example, an electric motor. The power source 32 of the first braking unit 30 is set to be different from the power source 36 of the second braking unit 34. The second braking unit 34 further includes the friction member BP and the caliper CP. The configuration of the friction member BP and the caliper CP of the second braking unit 34 is substantially the same as that of the friction member BP and the caliper CP of the first braking unit 30. The caliper CP is driven so that the friction member BP contacts the second rotating body F2 when driven by the power source 36. The second rotating body F2 is, for example, a disc brake rotor provided on the rear wheel A4 of the human-powered vehicle B. In the present embodiment, the second braking unit 34 is an electric braking unit. In the same manner as the second braking unit 34, in a case where the first braking unit 30 is also at least one of the electric braking unit, the regenerative braking unit, and the mechanical braking unit, the first braking unit 30 and the second braking unit 34 can use the same power source 32.

The braking device 26 further includes the operating device 38 that is manually operated to brake the rotating body F. An example of the operating device 38 is a lever. The operating device 38 includes a first operating member 38A and a second operating member 38B. The first operating member 38A brakes one of the rotating bodies F. The second operating member 38B brakes the rotating body F that is not braked by the first operating member 38A. In the present embodiment, the first rotating body F1 is braked by operating the first operating member 38A, and the second rotating body F2 is braked by operating the second operating member 38B.

Figure 3:
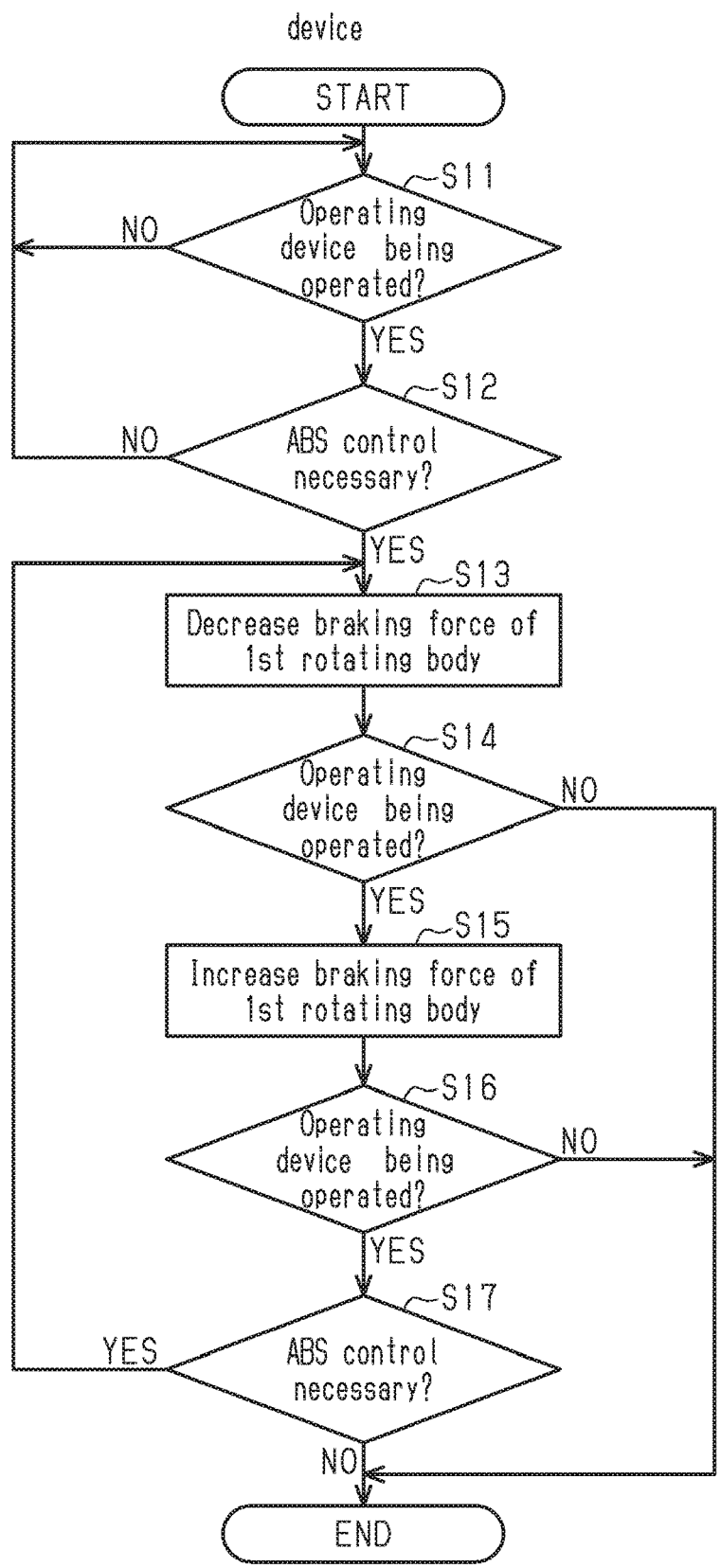
FIG. 3 is a flowchart showing one example of a control executed by an electronic controller of FIG. 2.

The control performed by the electronic controller 14 on the first braking unit 30 will be now described with reference to FIG. 3. The electronic controller 14 starts the program in a case where the traveling speed of the human-powered vehicle B is higher than or equal to a predetermined speed based on the information of the estimation unit 16 and the storage unit 18.

In step S11, the electronic controller 14 determines whether or not the operating device 38 is being operated. Specifically, the electronic controller 14 determines whether or not the operating device 38 is being operated based on the detection result of the third detector 20C. In case an affirmative determination is given, step S12 is executed. In case a negative determination is given, step S11 is executed again.

In step S12, the electronic controller 14 determines whether or not ABS control is necessary. The electronic controller 14 determines whether or not ABS control is necessary based on the information of the estimation unit 16 and the storage unit 18. The electronic controller 14 acquires the rotation speed of the front wheel A3 on which the first rotating body F1 is provided and the rotation speed of the rear wheel A4 on which the second rotating body F2 is provided. The rotation speed of the front wheel A3 is subtracted from the rotation speed of the rear wheel A4 and compared with a predetermined value to determine whether or not ABS control is necessary. In case an affirmative determination is given, the electronic controller 14 executes step S13. In case a negative determination is given, the electronic controller 14 again executes step S11.

In step S13, the electronic controller 14 decreases the braking force of the first rotating body F1 through the ABS control. More specifically, in a case where it is determined that the first rotating body F1 is locked in step S12, the electronic controller 14 controls the power source 32 of the first braking unit 30 to decrease the braking force acting on the first rotating body F1. After the execution of step S13, the electronic controller 14 executes step S14.

In step S14, the electronic controller 14 determines again whether or not the operating device 38 is being operated in the same manner as in step S11. In case an affirmative determination is given, step S15 is executed. In case a negative determination is given, the program is terminated.

In step S15, the electronic controller 14 increases the braking force of the first rotating body F1. Specifically, the electronic controller 14 controls the power source 32 of the first braking unit 30 to increase the braking force acting on the first rotating body F1. After the execution of step S15, the electronic controller 14 executes step S16.

In step S16, the electronic controller 14 determines again whether or not the operating device 38 is being operated in the same manner as in step S11. In case an affirmative determination is given, the electronic controller 14 executes step S17. In case a negative determination is given, the electronic controller 14 terminates the program.

In step S17, the electronic controller 14 determines whether or not the ABS control is necessary for the first rotating body F1, in the same manner as in step S12. In case an affirmative determination is given, the electronic controller 14 again executes step S13. In case a negative determination is given, the electronic controller 14 terminates the program.

Figure 4:
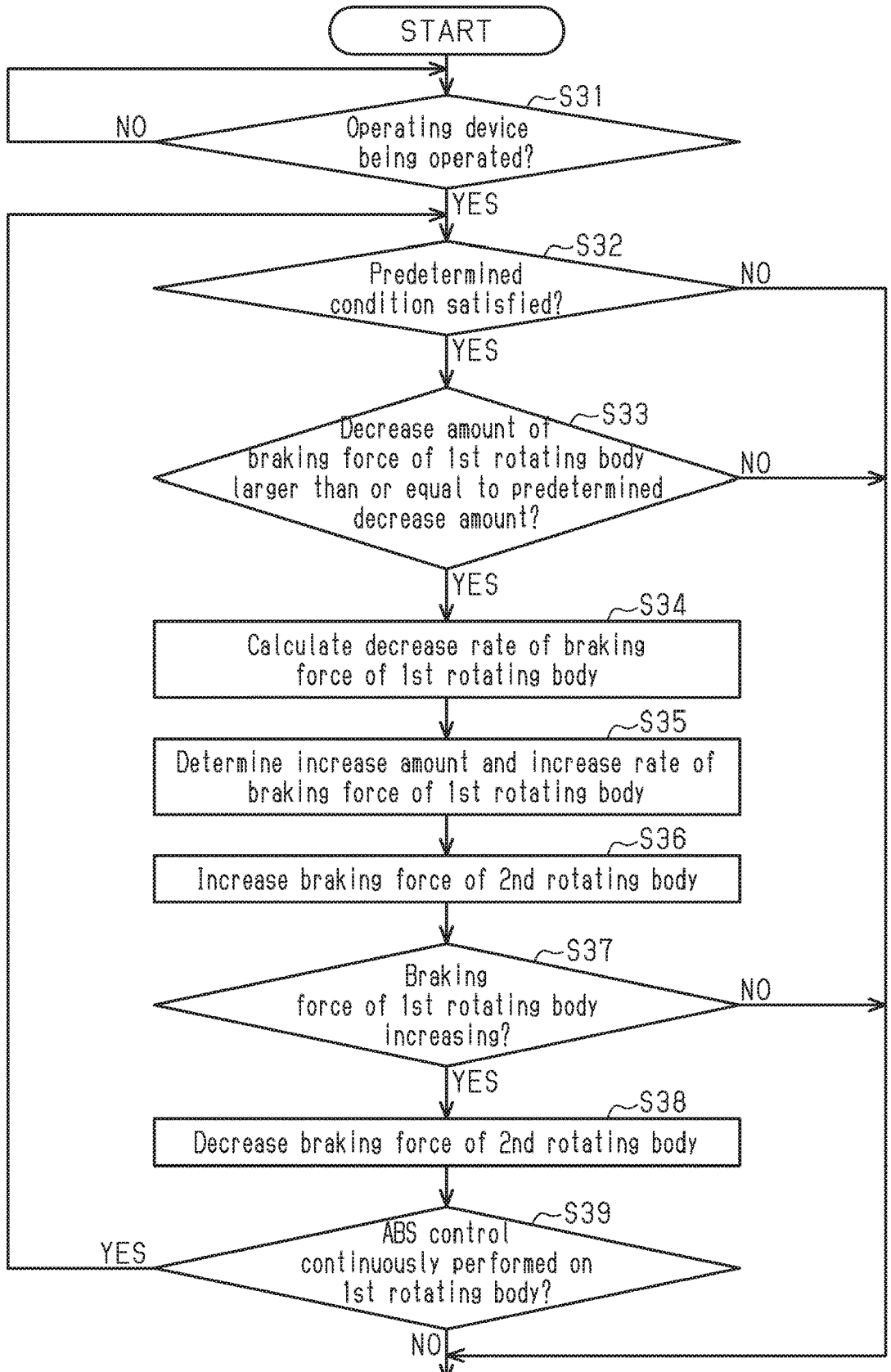
FIG. 4 is a flowchart showing one example of a control executed by the electronic controller of FIG. 2.

The control performed by the electronic controller 14 on the second braking unit 34 will be now described with reference to FIG. 4. The electronic controller 14 starts the program in a case where the traveling speed of the human-powered vehicle B is higher than or equal to a predetermined speed based on the information of the estimation unit 16 and the storage unit 18.

In step S31, the electronic controller 14 determines whether or not the operating device 38 is being operated. In case an affirmative determination is given, the electronic controller 14 executes step S32. In case a negative determination is given, the electronic controller 14 again executes step S31.

In step S32, the electronic controller 14 determines whether or not the braking force of the first rotating body F1 included in the plurality of rotating bodies F will be decreased by the ABS control. Specifically, the electronic controller 14 determines whether or not a predetermined condition has been satisfied based on traveling information related to traveling of the human-powered vehicle B. An example of the traveling information is the traveling speed of the human-powered vehicle B. In a case where the predetermined condition is satisfied, the electronic controller 14 determines that the ABS control will decrease the braking force of the first rotating body F1. In case an affirmative determination is given, the electronic controller 14 executes step S33. In case a negative determination is given, the electronic controller 14 executes step S39.

The electronic controller 14 increases the braking force of the second rotating body F2 in a case where the decrease amount of the braking force of the first rotating body F1 is larger than or equal to the predetermined decrease amount. In step S33, the electronic controller 14 calculates the decrease amount of the braking force of the first rotating body F1, and determines whether or not the decrease amount of the braking force of the first rotating body F1 is larger than or equal to a predetermined decrease amount. An example of the information for calculating the decrease amount of the braking force is the pressing force of the friction member onto the first rotating body F1. Furthermore, in the present embodiment, since the first braking unit 30 is a hydraulic braking unit, one example of information for calculating the decrease amount of the braking force is the hydraulic pressure applied to the friction member BP. In case an affirmative determination is given, the electronic controller 14 executes step S34. In case a negative determination is given, the electronic controller 14 executes step S39.

In step S34, the electronic controller 14 calculates the decrease rate of the braking force of the first rotating body F1. The decrease rate of the braking force of the first rotating body F1 is calculated based on, for example, the detection result of the second detector 20B. After the execution of step S34, the electronic controller 14 executes step S35.

The electronic controller 14 increases the braking force of the second rotating body F2 so that the braking force of the second rotating body F2 does not exceed the upper limit braking force. In step S35, the electronic controller 14 determines the increase amount and the increase rate of the braking force acting on the second rotating body F2. The electronic controller 14 determines the increase amount of the braking force so that the braking force of the second rotating body F2 does not exceed the upper limit braking force. In one example, the increase amount of the braking force acting on the second rotating body F2 is the same value as the decrease amount of the braking force of the first rotating body F1. In the present embodiment, since the first braking unit 30 is the hydraulic braking unit and the second braking unit 34 is the electric braking unit, the braking force of the hydraulic braking unit is converted into the braking force of the electric braking unit to determine the driving amount of the power source 36 of the electric braking unit. In other words, in a case where the power source 32 of the first braking unit 30 is different from the power source 36 of the second braking unit 34, the driving amount of the power source 36 is determined based on the correlation between the driving amount of the power source 32 and the driving amount of the power source 36. In one example, the correlation between the driving amount of the power source 32 in the first braking unit 30 and the driving amount of the power source 36 in the second braking unit 34 is stored in advance in the storage unit 18. Further, the increase amount of the braking force of the second rotating body F2 can be adjusted based on the load applied to the front wheel A3 on which the first rotating body F1 is provided and the load applied to the rear wheel A4 on which the second rotating body F2 is provided. The electronic controller 14 adjusts the increase rate of the braking force of the second rotating body F2 in accordance with the decrease rate of the braking force of the first rotating body F1. In one example, the electronic controller 14 increases the braking force of the second rotating body F2 at the same rate as the decrease rate of the braking force of the first rotating body F1. After the execution of step S35, the electronic controller 14 executes step S36.

In step S36, the electronic controller 14 controls the second braking unit 34 so that the braking force of the second rotating body F2, which is different from the first rotating body F1 and included in the plurality of rotating bodies F, is increased by a force that is different from the hydraulic pressure. The force that is different from the hydraulic pressure is electric power. The electronic controller 14 increases the braking force of the second rotating body F2 in accordance with the decrease amount of the braking force of the first rotating body F1. The electronic controller 14 increases the braking force of the second rotating body F2 so that an absolute value of a difference between the increase amount of the braking force of the second rotating body F2 and the decrease amount of the braking force of the first rotating body F1 becomes smaller than or equal to a predetermined difference. In one example, the predetermined difference is zero. After the execution of step S36, the electronic controller 14 executes step S37.

In a case where the braking force of the first rotating body F1 is increased after having been decreased, the electronic controller 14 decreases the braking force of the second rotating body F2. In step S37, the electronic controller 14 determines whether or not the braking force of the first rotating body F1 is increasing after having been decreased. In case an affirmative determination is given, the electronic controller 14 executes step S38. In case a negative determination is given, the electronic controller 14 executes step S39.

In step S38, the electronic controller 14 decreases the braking force of the second rotating body F2. In one example, the decrease amount of the braking force of the second rotating body F2 is the same value as the increase amount of the braking force of the first rotating body F1. After the execution of step S38, the electronic controller 14 executes step S39.

In step S39, the electronic controller 14 determines whether or not the ABS control is continuously performed on the first rotating body F1. In case an affirmative determination is given, the electronic controller 14 again executes step S32. In case a negative determination is given, the electronic controller 14 terminates the program.

Second Embodiment

The brake system 10 of the second embodiment will be now described with reference to FIGS. 5 and 6. Same reference numerals are given to those components that are the same as the corresponding components of the first embodiment. Such components will not be described in detail.

Figure 5:
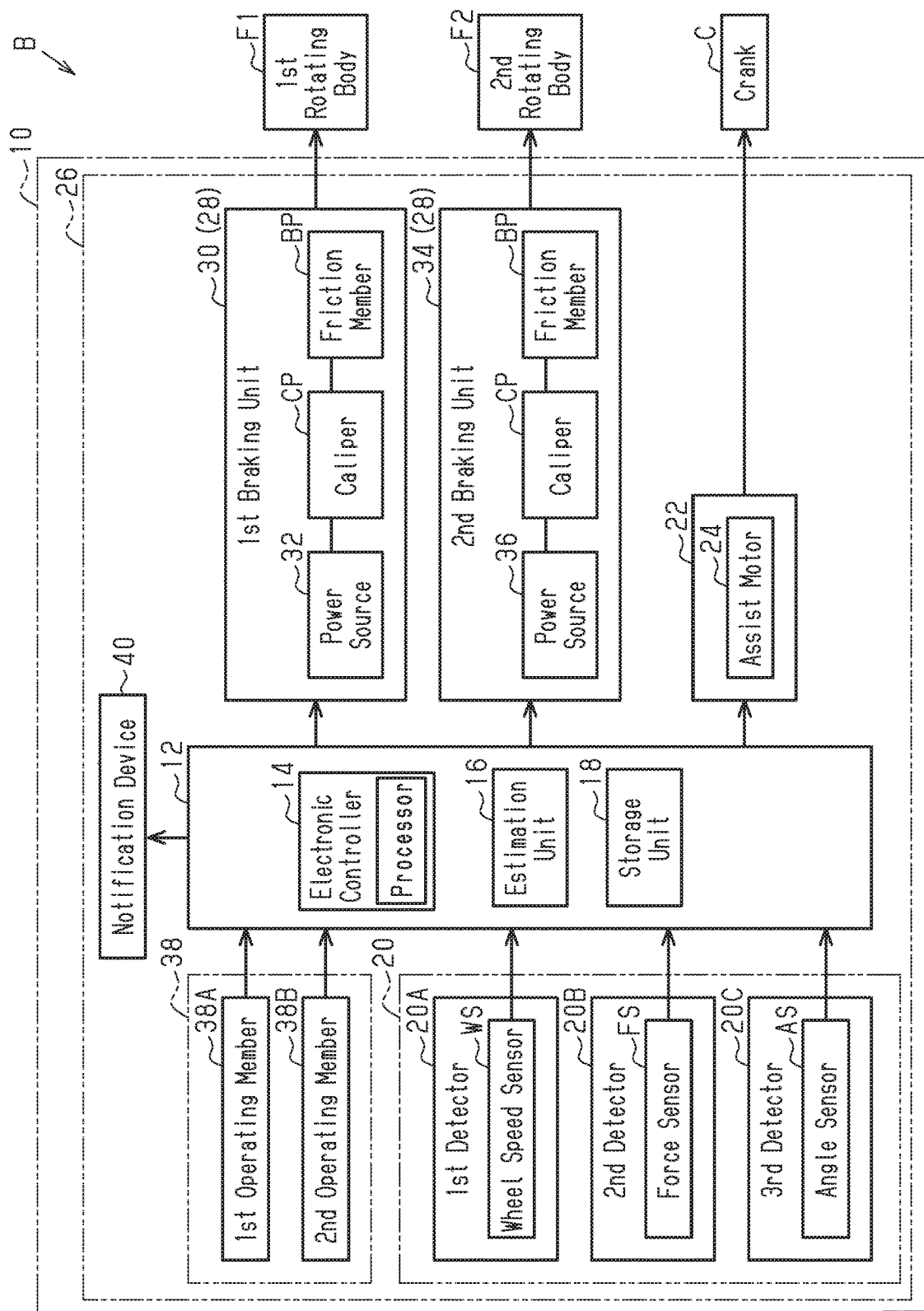
FIG. 5 is a block diagram of a brake system according to a second embodiment.
Figure 6:
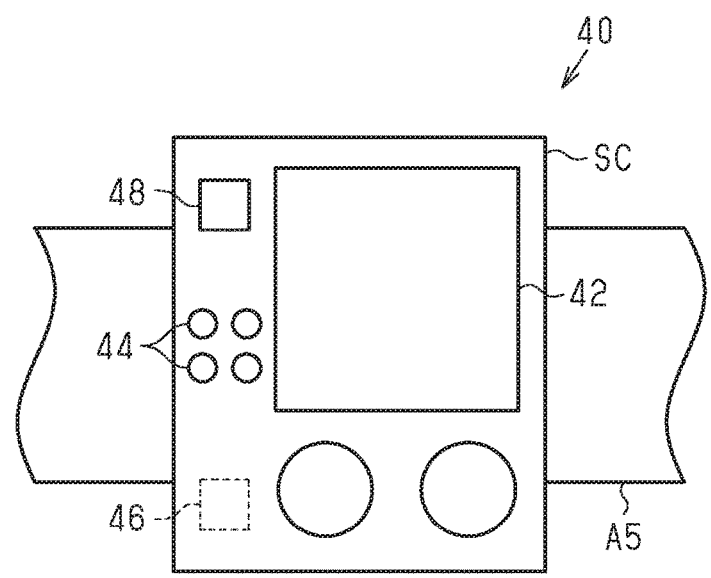
FIG. 6 is a front view of a notification device shown in FIG. 5.

As shown in FIG. 5, the brake system 10 further includes a notification device 40. In a case where the braking force of the first rotating body F1 included in the plurality of rotating bodies F is decreased by the ABS control, the electronic controller 14 uses the notification device 40 to output brake-related information for braking the second rotating body F2, which is different from the first rotating body F1 included in the plurality of rotating bodies F. The brake-related information includes information prompting the user to perform an operation for braking the second rotating body F2. The user riding the human-powered vehicle B operates the second operating member 38B based on, for example, the brake-related information output from the notification device 40.

The configuration of the notification device 40 will be now described with reference to FIG. 6. The notification device 40 outputs the brake-related information using the means of at least one of vibration and sound. The notification device 40 includes a display 42 configured to display the brake-related information. The notification device 40 further includes a light emitting element 44, a vibration element 46, and a speaker 48. In the example shown in FIG. 6, the notification device 40 is a cycle computer SC.

The display 42 notifies the brake-related information by displaying characters, numerals, symbols, patterns, images, icons, and the like. The user can recognize the brake-related information by looking at the information displayed on the display 42.

The light emitting element 44 notifies the brake-related information through an illuminated state. The light emitting element 44 includes one or more light emitting elements 44. The light emitting elements 44 are, for example, a light emitting diode (LED) lamps. The illuminated state of the light emitting elements 44 includes the type (color), number, and illumination patterns of the light emitting elements 44 that are illuminated. The illumination patterns include continuous illumination, intermittent illumination, and the like of the light emitting elements 44. In the case of intermittent illumination, the illumination patterns include changes in the illumination time and changes in the illuminated color. The user can recognize the brake-related information by looking at the illuminated state of the light emitting elements 44. The relationship between the brake-related information and the illuminated state of the light emitting elements 44 is acknowledged by the user in advance.

The vibration element 46 notifies the brake-related information through vibration. The vibration output from the vibration element 46 includes a plurality of vibration patterns. The vibration output from the vibration element 46 is transmitted to the handlebar A5 held by the user. The user can recognize the brake-related information when feeling the vibration output from the vibration element 46. The relationship between the brake-related information and the vibration output from the vibration element 46 is acknowledged by the user in advance.

The speaker 48 notifies the brake-related information through sound. The sound output from the speaker 48 includes a voice, a melody, a beeping sound, and the like. The user can recognize the brake-related information by listening to the sound from the speaker 48. The relationship between the brake-related information and the sound from the speaker 48 is acknowledged by the user in advance.

Modifications

The description related with the above embodiments exemplifies, without any intention to limit, an applicable form of a brake control device, a braking device, and a brake system according to the present disclosure. In addition to the embodiments described above, the brake control device, the braking device, and the brake system according to the present disclosure are applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

The information for estimating the braking force can be changed in any manner. For example, the braking force can be estimated based on the operation amount of the operating device 38. Furthermore, the information related with the traveling speed of the human-powered vehicle B can be further used for the estimation of the braking force.

Any rotating body F can be selected. For example, the first rotating body F1 can be a disc brake rotor of the rear wheel A4 and the second rotating body F2 can be the disc brake rotor of the front wheel A3. Furthermore, the front wheel A3 or the rear wheel A4 can serve the rotating body F. In this case, the braking device is a rim brake device.

The first braking unit 30 and the second braking unit 34 can be combined in any manner. For example, the mechanical braking unit can be set as the first braking unit 30, and the regenerative braking unit can be set as the second braking unit 34. The first braking unit 30 and the second braking unit 34 can both be electric braking units.

The notification device 40 can be changed to any configuration. In one example, as shown in FIG. 7, the notification device 40 can be provided on the operating device 38.

Figure 7:
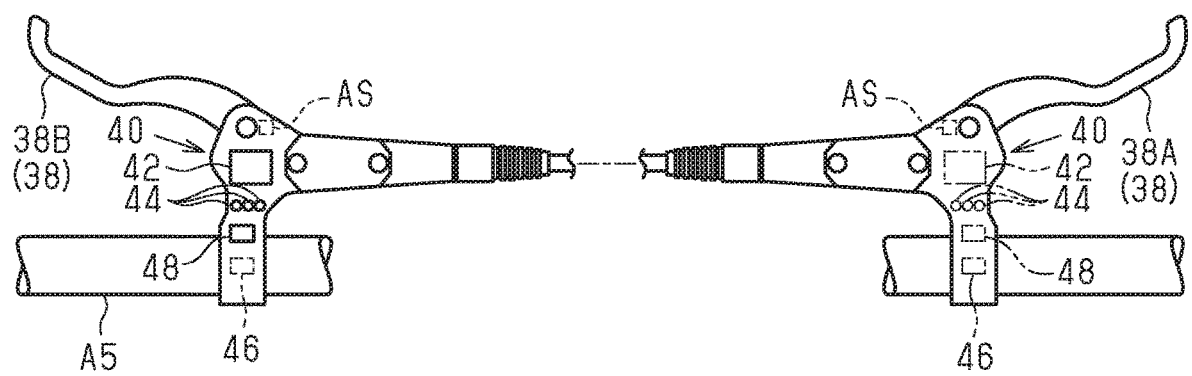
FIG. 7 is a plan view showing an operating unit in accordance with a modification.

In this case, as indicated by solid lines in FIG. 7, it is desirable that the notification device 40 be provided on the second operating member 38B. In other words, it is desirable that the notification device 40 for outputting information prompting the user to perform an operation for braking the second rotating body F2 be provided on the second operating member 38B, which is used to brake the second rotating body F2 and which is different from the first rotating body F1. In a case where the braking force of the second rotating body F2, which is different from the first rotating body F1 included in the plurality of rotating bodies F, is decreased by the ABS control, the electronic controller 14 may have the notification device 40 output the brake-related information for braking the first rotating body F1 included in the plurality of rotating bodies F. In this example, the brake-related information includes information prompting the user to perform an operation for braking the first rotating body F1. In this case, as shown by the double-dashed lines in FIG. 7, it is desirable that the notification device 40 be provided on the first operating member 38A. In other words, it is desirable that the notification device 40 for outputting information prompting the user to perform an operation for braking the first rotating body F1 be provided on the first operating member 38A, which is used to brake the first rotating body F1.

The ABS control does not necessarily have to be executed by the brake control device 12. In one example, the brake system 10 includes an ABS electronic controller (not shown) that is different from the brake control device 12. The ABS electronic controller includes a CPU or an MPU. The ABS electronic controller is configured to execute the ABS control.

What is claimed is:

1. A brake control device comprising: an electronic controller configured to control: a first power source of a first braking unit that is configured to brake a first rotating body of a plurality of rotating bodies of a human-powered vehicle, and a second power source of a second braking unit that is configured to brake a second rotating body of the plurality of rotating bodies of the human-powered vehicle, the second rotating body being different from the first rotating body, the first power source including a first motor, the second power source including a second motor, and the second power source being different than the first power source, the electronic controller being further configured to, upon determining an ABS control is performed to decrease a braking force of the first rotating body using the first power source, control the second power source of the second braking unit to increase a braking force of the second rotating body using a force that is different from hydraulic pressure.

2. The brake control device according to claim 1, wherein the electronic controller is configured to increase the braking force of the second rotating body in accordance with a decrease amount of the braking force of the first rotating body.

3. The brake control device according to claim 2, wherein the electronic controller is configured to increase the braking force of the second rotating body so that an absolute value of a difference between an increase amount of the braking force of the second rotating body and the decrease amount of the braking force of the first rotating body becomes smaller than or equal to a predetermined difference.

4. The brake control device according to claim 3, wherein the predetermined difference is zero.

5. The brake control device according to claim 1, wherein the electronic controller is configured to increase the braking force of the second rotating body upon determining a decrease amount of the braking force of the first rotating body is occurring that is larger than or equal to a predetermined decrease amount.

6. The brake control device according to claim 1, wherein the electronic controller is configured to increase the braking force of the second rotating body so that the braking force of the second rotating body does not exceed an upper limit braking force.

7. The brake control device according to claim 1, wherein the electronic controller is configured to adjust an increase rate of the braking force of the second rotating body in accordance with a decrease rate of the braking force of the first rotating body.

8. The brake control device according to claim 1, wherein the electronic controller is configured to decrease the braking force of the second rotating body upon determining the braking force of the first rotating body has increased after the braking force of the first rotating body has decreased.

9. The brake control device according to claim 1, wherein the electronic controller is configured to determine that the ABS control will decrease the braking force of the first rotating body upon determining a predetermined condition is satisfied.

10. The brake control device according to claim 9, wherein the electronic controller is configured to determine whether or not the predetermined condition is satisfied based on traveling information related with traveling of the human-powered vehicle.

11. A braking device the brake control device according to claim 1, and further comprising the braking unit.

12. The braking device according to claim 11, wherein the braking unit includes a first braking unit that brakes the first rotating body and a second braking unit that brakes the second rotating body.

13. The braking device according to claim 12, wherein the first braking unit includes a power source and the second braking unit includes a power source that is different from the power source of the first braking unit.

14. The braking device according to claim 12, wherein the first braking unit includes at least one of a hydraulic braking unit, an electric braking unit, a regenerative braking unit, and a mechanical braking unit.

15. The braking device according to claim 12, wherein the second braking unit includes at least one of an electric braking unit, a regenerative braking unit, and a mechanical braking unit, and does not include a hydraulic braking unit.

16. The braking device according to claim 14, wherein the regenerative braking unit includes an assist motor configured to assist a driving force of the human-powered vehicle.

17. The braking device according to claim 11, further comprising an operating device configured to be manually operated to brake the rotating body with the braking unit.

18. A brake control device comprising: an electronic controller configured to control: a first power source of a first braking unit that is configured to brake a first rotating body of a plurality of rotating bodies of a human-powered vehicle, and a second power source of a second braking unit that is configured to brake a second rotating body of the plurality of rotating bodies of the human-powered vehicle, the second rotating body being different from the first rotating body, the first power source including a first motor, the second power source including a second motor, and the second power source being different than the first power source the electronic controller being further configured to control the first power source of the first braking unit to perform an ABS control for braking the first rotating body, and upon determining the ABS control is being performed to decrease a braking force of the first rotating body, the electronic controller being configured to, using a notification device, notify a user of brake-related information for braking the second rotating body.

19. The brake control device according to claim 18, wherein the brake-related information includes information prompting an operation to be performed to brake the second rotating body.

20. A braking device comprising the brake control device according to claim 18, and the braking device further comprising: the notification device.

21. The braking device according to claim 20, wherein the notification device includes a display configured to display the brake-related information.

22. The braking device according to claim 20, wherein the notification device is configured to output the brake-related information by producing at least one of light, vibration, and sound.

23. A brake system comprising: a brake control device including an electronic controller configured to control: a first power source of a first braking unit that is configured to brake a first rotating body of a plurality of rotating bodies of a human-powered vehicle, and a second power source of a second braking unit that is configured to brake a second rotating body of the plurality of rotating bodies of the human-powered vehicle, the second rotating body being different from the first rotating body, the first power source including a first motor, the second power source including a second motor, and the second power source being different than the first power source; and an assist device including an assist motor configured to assist driving of the human-powered vehicle, the electronic controller being further configured to, upon determining an ABS control is performed to decrease a braking force of the first rotating body using the first power source, control the second power source of the second braking unit to increase a braking force of the second rotating body using a force that is different from hydraulic pressure.

24. The brake control device according to claim 1, wherein the electronic controller is configured to control the second braking unit to increase the braking force of the second rotating body using electric power.

25. The brake control device according to claim 18, wherein the electronic controller is configured to control the second braking unit to increase the braking force of the second rotating body using electric power.

26. The brake system according to claim 23, wherein the electronic controller is configured to control the second braking unit to increase the braking force of the second rotating body using electric power.

* * * * *